3,053,901
POLYARYL SULPHIDE
Jan Hendrik Uhlenbroek, Weesp, Netherlands, assignor to North American Philips Company, Inc., New York, N.Y., a corporation of Delaware
No Drawing. Filed June 9, 1960, Ser. No. 34,869
Claims priority, application Netherlands June 13, 1959
6 Claims. (Cl. 260—609)

The invention relates to the preparation of polyaryl sulphides, in particular of diaryl sulphides, from an alkali compound or an aryl thiophenol and an aryl chloride.

In the literature some methods are described for the preparation of diaryl sulphides which, however, are not suitable for practical purposes. It is described, for example, that in the conversion of aryl bromides with lead mercaptides, zinc mercaptides or mercury mercaptides at 225–230° C. aromatic thioethers are obtained in good yields. For practical purposes this method is not very attractive, also because of the high costprice of the bromides. It is described that aryl chlorides are not very well useful for this method owing to the slight reactivity of these compounds.

It is also described, that phenyl-iodide can be converted into a thioether with a thiophenol in the presence of copper as a catalyst.

It is further described that reaction of a nitrobromobenzene and a nitrobromotoluene with sodium thiophenolate results in thioethers only when the bromine atom occupies the ortho-position or para-position with respect to the nitro group; as is known, the reactivity of such a bromine atom is increased by these nitro groups.

It is described in addition that 2-(2-methyl-5 halogenophenylmercapto)-4 halogeno (or alkyl or alkoxy) benzoic acids can be prepared by heating a 2-halogeno-4-halogeno (or alkyl or alkoxy) benzoic acid with a metal salt of a 2-methyl-5-halogeno thiophenol in the presence of a catalyst, which are copper powder, copper halogenide and copper oxide.

In contrast with what might be expected on the basis of what is known from the art, applicants have found that polyaryl sulphides, and in particular diaryl sulphides, can be prepared from aryl chlorides and alkali compounds of thiophenols.

The invention relates to a process for the preparation of polyaryl sulphides, and in particular of diaryl sulphides, from alkali thiophenolates and aryl halogenides, characterized in that a compound of the formula $(R_n.Ar.S_x).Ar.R'_m$ is prepared by causing to react a compound of the formula $R_n.Ar.SMe$ (A)

with a compound of the formula $Cl_x.Ar.R'_m$ (B)

in which formulae Ar may represent a phenyl radical or naphthyl radical, Me an alkali metal and preferably sodium, $R_n$ and $R'_m$ chlorine atoms or lower alkyl groups or a combination thereof, $x=1$ or 2, $n$ is an integer numeral of from 0 to 5 and is 1 if R represents chlorine or also chlorine and $m$ may be an integer numeral of from 0 to 5 if $x=1$ and of from 0 to 4 if $x-2=2$.

The reaction according to the invention is to be considered particularly for the preparation of diphenyl sulphides, in which R' represents chlorine and $m=1$, 2 or 3 and of those in which R represents chlorine and $n=1$ or R and R' in these cases both represent chlorine.

The process is particularly suitable for the preparation of 2,4,5,4'-tetrachlorodiphenylsulphide from 1,2,4,5-tetrachlorobenzene and 4-chlorothiophenol-sodium or 4-chlorothiophenol-potassium. As alkyl-substituted aryl compounds are to be considered particularly those aryl compounds substituted by a methyl group.

Applicants have found that the yield of diaryl sulphide is favourably influenced to a considerable extent by using a considerable excess of the reaction component of the Formula B. Favourable molar ratios of A and B are 1:4 to 1:40 and in particular 1:6 to 1:20.

The course of the reaction and the yield of polyaryl sulphide according to the invention is influenced favourably by using a solvent in which both reaction components are soluble. As such are to be considered monovalent alcohols, for example cyclohexanol, ethers, for example dioxane, dimethyl sulphoxide and tertiary nitrogen bases, and in particular aromatic tertiary nitrogen bases, such as pyridines and quinoline. Dimethyl formamide is a particularly suitable solvent.

*Example 1*

123.6 g. of 4-chlorothiophenol (0.8 mol) were dissolved in 150 cm.³ of a 30% by weight sodium methylate solution in methanol. The solution was evaporated to dryness in vacuo. The residue, 4-chlorothiophenol sodium, was dissolved in 1400 cm.³ dimethyl formamide, and added to a hot solution of 3600 g. of 1,2,4,5-tetrachlorobenzene (16 mol) in 2600 cm.³ of dimethyl formamide, whilst stirring. Then the resulting mixture was refluxed for 90 minutes, whilst stirring. Subsequently, the reaction mixture was cooled and stored at 0° C. for approximately 16 hours. Crystallized tetrachlorobenzene and sodium chloride were filtered off and washed with 1000 cm.³ of cold dimethyl formamide. The filtrate was evaporated until approximately 90% of the used dimethylformamide had been recovered. The residue was then subjected to a steam distillation to remove traces of tetrachlorobenzene. The residue of the steam distillation was taken up in 1.5 liters of ether, filtered and washed twice with water. After drying on sodium sulphate and evaporation, the 2,4,5,4'-tetrachlorodiphenyl sulphide was obtained. Yield: 215 g. (83%); melting point: approximately 84° C.

The compounds mentioned in Table I were prepared in an analogous manner. Table II states the starting substances (columns 2 and 3), the molar ratios in which the compounds according to the Formulae B and A are used (column 4), the solvent used (column 5), the melting point and/or the boiling point of the resulting products (column 6) (the melting point is indicated by S and expressed in ° C., the boiling point by F and expressed in ° C. at the pressure used in millimetres of mercury column), and the yield of product obtained (column 7).

The products obtained according to the process of the invention often have an acaricidal activity and/or may be used as intermediates for the preparation of acaricidal compounds. They may be converted into said compounds by oxidation to the corresponding sylphoxide and/or sulphones. The reaction products may be converted into higher-chlorinated products by chlorination. For example, 2,5-dichloro- and 2,5,4'-trichlorodiphenyl sulphide may be chlorinated to 2,4,5,4'-tetrachlorodiphenyl sulphide and 2,5-dichloro-4'-methyldiphenyl sulphide to 2,4,5-trichloro-4'-methyldiphenyl sulphide. The thus obtained products, which may also be obtained directly according to the process of the invention, have acaricidal activities. The 2,4,5,4'-tetrachlorodiphenyl sulphide is an interesting acaricide having an excellent activity against eggs and larvae of red spider mites.

Table I

| Ex. No. | Products |
|---|---|
| I | 2.4.5.4'-tetrachlorodiphenylsulphide. |
| II | Do. |
| III | Do. |
| IV | 2.5.4'-trichlorodiphenylsulphide. |
| V | Do. |
| VI | Do. |
| VII | Do. |
| VIII | 2.5-dichlorodiphenylsulphide. |
| IX | 2-chloro-4'-methyldiphenylsulphide. |
| X | 2.5-dichloro-4'-methyldiphenylsulphide. |
| XI | 3.5-dichloro-4'-methyldiphenylsulphide. |
| XII | 2.4.5-trichloro-4'-methyldiphenylsulphide. |
| XIII | 2.5-dichloro-2'.5'-dimethyldiphenylsulphide. |
| XIV | 2.5-dichloro-2'.4'-dimethyldiphenylsulphide. |
| XV | 2.5-dichloro-3'.4'-dimethyldiphenylsulphide. |
| XVI | 2.4.5-trichloro-3.6.4'-trimethyldiphenylsulphide. |
| XVII | S.S'-bis(4'-chlorophenyl)-2.5-dichlorophenylenedisulphide-1.4. |
| XVIII | Phenyl-$\alpha$-naphtylsulphide. |
| XIX | 2.4.5.4'-tetrachlorodiphenylsulphide. |
| XX | Do. |

Table II

| Ex. No. | $R_n.Ar.SMe$ | $Cl_x Ar.R'_m$ | B:A | Diluent | Physical constants resulting products | Yield in percent |
|---|---|---|---|---|---|---|
| I | 4-chlorothiophenol-Na | 1.2.4.5-tetrachlorobenzene | 20 | Dimethylformamide | S=ca. 84° C | 83 |
| II | do | do | 10 | do | S=85–86° C | 68 |
| III | do | do | 10 | Pyridine | S=84.5–85.5° C | 65 |
| IV | do | 1.2.4-trichlorobenzene | 6 | do | S=75–76° C | 63 |
| V | do | do | 6 | Quinoline | S=75–76° C | 69 |
| VI | do | do | 6 | Triethanolamine | S=75–76° C | 60 |
| VII | do | do | 6 | Dimethylformamide | S=75–76° C | 62 |
| VIII | Thiophenol-Na | do | 6.2 | Quinoline | F=158–160° C. at 1.1 mm. mercury | 75 |
| IX | p-Thiokresol-Na | 1.2-dichlorobenzene | 6.2 | Dimethylformamide | F=159–161° C. at 1 mm. mercury | 55 |
| X | do | 1.2.4-trichlorobenzene | 6.4 | Quinoline | S=67.5–68.5° C | 52 |
| XI | do | 1.3.5-trichlorobenzene | 5.5 | do | F=157° C. at 1.0 mm. mercury, S=93° C. | 68 |
| XII | do | 1.2.4.5-tetrachlorobenzene | 10 | Dimethylformamide | S=93° C | 51 |
| XIII | 2.5-dimethylthiophenol-Na | 1.2.4-trichlorobenzene | 6.3 | Quinoline | S=60–61° C | 75 |
| XIV | 2.4-dimethylthiophenol-Na | do | 7.5 | do | F=163–166° C. at 1.0 mm. mercury | 55 |
| XV | 3.4-dimethylthiophenol-Na | do | 7.8 | do | F=192° C. at 0.7 mm. mercury | 71 |
| XVI | p-Thiokresol-Na | 1.2.4.5-tetrachloro-p.-xylene | 8.5 | Dimethylformamide | S=96° C | 60 |
| XVII | 4-chlorothiophenol-Na | 1.2.4.5-tetrachlorobenzene | 1.0 | Pyridine | S=224° C | 78 |
| XVIII | Thiophenol-Na | $\alpha$-Chloronaphtalene | 5 | Dimethylformamide | S=38° C | 60 |
| XIX | 4-chlorothiophenol-Na | 1.2.4.5-tetrachlorobenzene | 20 | Cyclohexanol | S=ca. 80° C | 42 |
| XX | do | do | 20 | Dimethylsulphoxide | S=ca. 80° C | 45 |

What is claimed is:

1. A method for preparing polyaryl sulfides of the formula: $(R_n.Ar.S)x.Ar.R^1_m$ wherein R and $R^1$ are each members of the group consisting of chlorine and lower alkyl, Ar is a member of the group consisting of phenyl and naphthyl, $x$ is a number selected from the group consisting of 1 and 2, $n$ is an integer from 0 to 5, $m$ is an integer from 0 to 5 when $x=1$ and is an integer from 0 to 4 when $x=2$ comprising, condensing a compound of the formula $R_n ArSMe$ wherein Me is an alkali metal with a compound of the formula $Cl_x ArR^1_m$.

2. The method of claim 1 wherein a compound of the formula $ClC_6H_4SMe$ is employed as a reactant.

3. The method of claim 1 wherein a compound of the formula $ClArCl_m$, wherein Ar is a benzene radical and $m$ is an integer from 1 to 3, is employed as a reactant.

4. The method of preparing 2,4,5,4¹-tetrachlorodiphenyl sulfide comprising condensing 1,2,4,5-tetrachlorobenzene with an alkali metal 4-chlorothiophenolate wherein the alkali metal has an atomic weight of from 23 to 39.1 inclusive.

5. The method of claim 4 wherein the reaction is carried out at a temperature of from 100° C. to 250° C. in a solvent selected from the group consisting of dimethyl amide, pyridine, quinoline, and triethanolamine.

6. The method of claim 4 wherein the molar ratio of the chlorinated benzene to the phenolate is from 6:1 to 20:1.

References Cited in the file of this patent

UNITED STATES PATENTS 2,761,873    Gregory et al. _____ Sept. 4, 1956

OTHER REFERENCES

Huisman et al.: Rec. Trav. Chim. 77, 103–122 (1958).

UNITED STATES PATENT OFFICE
CERTIFICATE OF CORRECTION

Patent No. 3,053,901                         September 11, 1962

Jan Hendrik Uhlenbroek

It is hereby certified that error appears in the above numbered patent requiring correction and that the said Letters Patent should read as corrected below.

Column 1, line 65, for "if x-2=2" read -- if $X=2$ --.

Signed and sealed this 26th day of February 1963.

(SEAL)
Attest:

ESTON G. JOHNSON
Attesting Officer

DAVID L. LADD
Commissioner of Patents